United States Patent [19]
Genovesi

[11] Patent Number: 5,497,889
[45] Date of Patent: Mar. 12, 1996

[54] COMPACT DISC STORAGE CASE DISPLAY RACK

[76] Inventor: Arnold J. Genovesi, 144 Split Cedar Dr., Islandia, N.Y. 11722

[21] Appl. No.: 246,961

[22] Filed: May 20, 1994

[51] Int. Cl.⁶ .................................................. A47F 7/00
[52] U.S. Cl. .................... 211/40; 211/88; 40/124
[58] Field of Search ................... 211/40, 41, 94, 211/89, 88, 71; 40/124, 124.2, 124.4; 312/9.9, 9.45, 9.46

[56] References Cited

U.S. PATENT DOCUMENTS

| | | | |
|---|---|---|---|
| 4,573,749 | 3/1986 | Massaro | 211/40 |
| 4,940,147 | 7/1990 | Hunt | 211/71 X |
| 5,123,549 | 6/1992 | Fines et al. | 211/94 X |
| 5,148,925 | 9/1992 | Althoff et al. | 211/94 X |
| 5,232,089 | 8/1993 | Kim | 211/40 X |
| 5,253,767 | 10/1993 | Koeppel | 211/40 |
| 5,259,515 | 11/1993 | Koeppel | 211/40 |
| 5,259,517 | 11/1993 | Pancoe | 40/124 X |
| 5,351,835 | 10/1994 | Hallgren | 211/40 |
| 5,372,263 | 12/1994 | Niekel | 211/41 |

*Primary Examiner*—Robert W. Gibson, Jr.
*Attorney, Agent, or Firm*—Galgano & Burke

[57] ABSTRACT

A compact disc storage case display rack which provides for the display during storage of the front labels of stored cases and enables the presentation of an artistic display created by the joint arrangement of those labels.

12 Claims, 3 Drawing Sheets

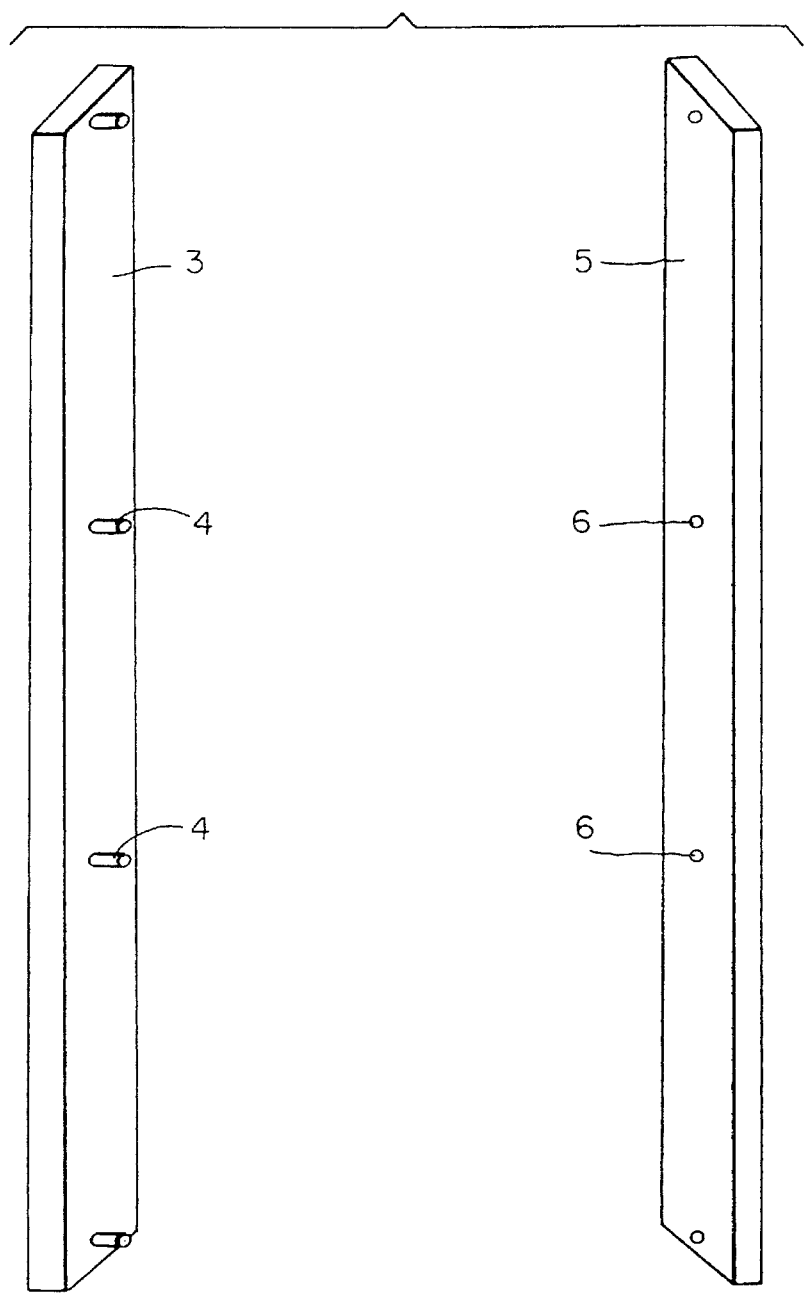
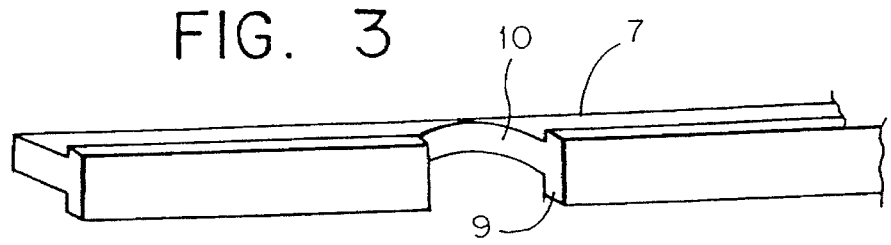

5,497,889

COMPACT DISC STORAGE CASE DISPLAY RACK

BACKGROUND OF THE INVENTION

Compact audio discs, or "compact discs" have become the standard recording medium for musical artists for numerous reasons, including the durability and longevity of the discs and their convenient size. Compact discs are sold and stored in generally transparent 5"×5 ½" plastic cases varying thickness from about ¼" to 1 ½" depending upon whether one or more discs is stored in the case. These cases typically contain cover labels (perhaps associated with a booklet describing the recording on the disc) secured behind and visible through the front face of a storage case. Such cover labels identify the compact disc within the case and often portray original works of art or performer photographs meant to enhance the aesthetic appeal of the case and its contents.

Available shelves or racks for the storage of compact disc cases are basically boxes in which one case is stacked on top of another, or tower arrangements in which the cases are inserted lengthwise into containers spaced one on top of the other. Neither of these configurations provides for the display during storage of the compact disc cover label, and instead only reveal during storage very narrow identifying label extensions along the edge of a case.

When selecting a compact disc stored on known compact disc storage shelves or racks, it is frequently difficult to read the small, identifying print along the edge portion of a label. Further, the attractive features of a disc case cover label are hidden from view during compact disc storage, which is when the display of such features would offer the greatest appeal.

It is therefore an object of the present invention to provide for the storage of recorded media storage cases, e.g., compact disc storage cases, in a manner which facilitates the ready selection of a desired case. It is another object of the present invention to provide a compact disc storage case display rack which provides for the display during storage of compact disc case cover labels, thereby enhancing the aesthetic appeal of the cases during storage. It is another object of the present invention to provide a compact disc storage case display rack which because of its display during storage of case cover labels, enhances the decor of the surroundings in which the rack is placed.

BRIEF DESCRIPTION OF THE DRAWINGS

FIG. 2 illustrates removable side panels of one embodiment of the present invention.

FIG. 3 is a partial, perspective view of a shelf used in accordance with one embodiment of the present invention.

SUMMARY OF THE INVENTION

Figure 1:
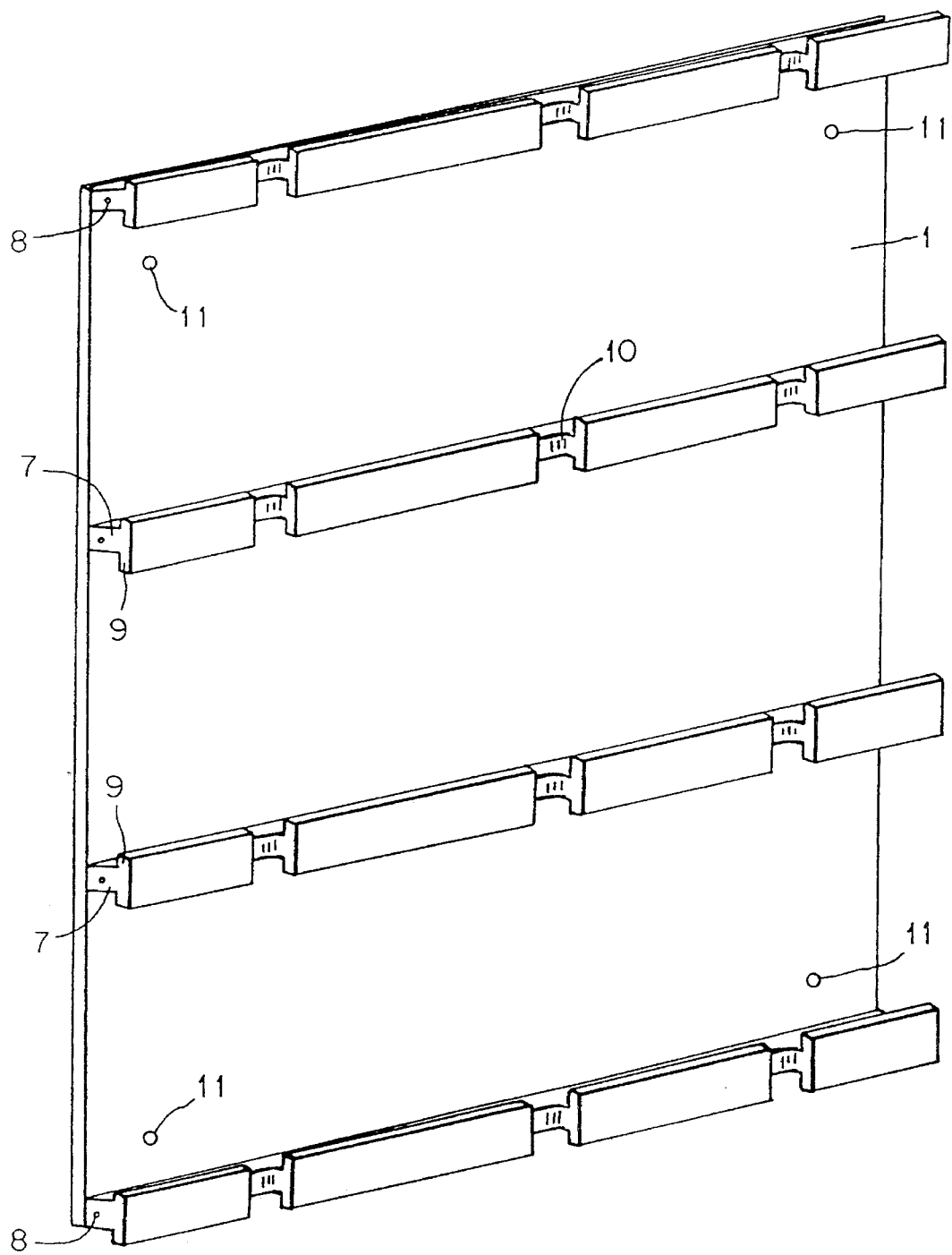
FIG. 1 is a partial, perspective view of a compact disc storage case display rack of one embodiment of the present invention with sections removed.

The various embodiments of the present invention are directed to display racks for cases commonly used to house recording media. While the illustrated embodiment and description herein refers to a display rack for compact disc storage cases, the claimed display racks may be suitable for other storage cases as well.

In accordance with the above-stated objects, a compact disc storage case display rack is provided which displays during storage the cover label of a compact disc storage case. The rack of the illustrated embodiment of the present invention comprises a typically rectangular or square back panel to which left and right side walls are releasably attached. A plurality of equally spaced, parallel shelves are affixed orthogonally to the side walls and back panel. These shelves are spaced at intervals slightly greater than the sum of the height of a compact disc display case, which is typically about 5", and the height of the upwardly extending flange for reasons explained in greater detail below. The shelves have a depth slightly greater than that of a compact disc storage case, or around ¼ "to 1 ½, and at their front ends have a flange portion which extends perpendicularly above and below the shelves to an extent which secures the compact disc storage cases during storage. In a preferred embodiment, the width of the side walls approximately equals the depth of the shelves and the width of the back panel. Equally-spaced, finger size apertures in the flanges facilitate the removal and/or insertion of compact disc storage cases.

A storage case is inserted onto the rack angularly beneath a downwardly protruding shelf flange and can be manually maneuvered to rest upright on a shelf. Similarly, a case can be removed from the rack by inserting a finger into an aperture beneath the case, lifting the case upwardly, withdrawing the bottom of the case beyond the lower flange and then lowering the case out of the rack.

In one embodiment of the instant invention, the back panel is provided with suitable means such as screw holes, nails, brackets, slots, adhesives, or hooks to allow mounting of the rack, e.g., onto a wall. In another embodiment of the instant invention, the rack is provided with fasteners to facilitate the attachment of two or more racks of the instant invention into a unitary structure.

The instant invention therefore provides for convenient and secure storage of compact discs in an aesthetically pleasing manner and in a way which will encourage recording artists and their publishers to consider using compact disc storage case cover labels as interrelated works of art capable of forming an appealing mosaic. This aesthetic aspect of the rack of the instant invention will encourage its prominent display and will contribute to the decor of its surroundings. Importantly, the rack of the instant invention, by its prominent display of case cover labels, will facilitate the selection of a desired disc, a particular advantage for those whom the small print on case label edges is difficult to read.

DETAILED DESCRIPTION

FIG. 1 illustrates one preferred embodiment of the instant invention in which generally rectangular back panel 1 is releasably secured to perpendicular side walls (not shown) by suitable means including magnets, screws, locking tabs, velcro suitable connectors. A plurality of shelves 7 are inserted in parallel relationship to one another between the side walls and are attached orthogonally to the side walls and/or back panel 1 by suitable means including nails, screws, staples or adhesives. The front edges of shelves 7 terminate in flanges 9 which extend perpendicular above and below shelves 7. In the preferred illustrated embodiment, the portions of flanges 9 below shelves 7 are slightly longer than the portions of flanges 9 above shelves 7. Shelves 7 are spaced from one another at a distance slightly greater than the sum of the height of a compact disc storage case, typically about 5" to 5 ½", and the distance which flange 9 extends above the upper surface of shelf 7. Shelf 7 preferably has a depth slightly greater then that of a disc storage case, or around ¼" to 1 ½"

As shown in FIGS. 1 and 3, shelves 7 and flanges 9 have spaced, apertures 10 dimensioned to receive at least one finger which facilitates the insertion and removal of a case from the rack. The illustrated apertures 10 are preferably equally spaced to coincide with the center of a stored case and are therefore approximately 5" from one another. FIG. 1 illustrates that the apertures 10 are positioned approximately directly above and below one another along axes parallel to the side walls. As seen in FIG. 1, holes 11 can be drilled in back 1 to facilitate mounting of the rack of the instant invention on a wall using, e.g., hooks, screws, nails, or brackets.

One form of removable side walls are illustrated in FIG. 2. According to the illustrated side walls, the left side wall is provided with horizontally protruding pegs 4 adapted to be received within complimentary holes 8 in shelf 7. The pegs 4 may be provided with a terminal slot to receive a screwdriver. In this manner, pegs 4 may be rotated or threadably received within holes 8 of shaft 7. Alternatively, pegs 4 may simply be received snugly within holes 8 forming an interference fit designed for quick removal and/or replacement. Opposing side wall 5 comprises complimentary holes 6 adapted to receive protruding posts (not shown) extending from the right side of shelf 7. From the present description, it will be understood that by simply removing the right and left side walls of two storages racks, respectively, that the racks can be joined together to form a single, unitary rack which will receive twice as many storage cases then would a single rack. It will also be understood that a wide assortment of releasable attaching members can be employed and the the present invention is not limited to the illustrated embodiments.

The preferred aspect of the present invention provides for forming the overall storage rack so that it can act as a subcomponent of a much larger rack assembly. For this purpose, side walls 3 are 5 are releasably attached to shelves 7 and the rack can be provided with hidden connecting members for connecting a series of racks, such as the racks shown in FIG. 1, to a similar racks. In this fashion, a consumer can start with one rack and, after than rack is full, purchase another rack which can be connected to the rack shown in FIG. 1. It is contemplated that consumers, retailers and others may wish to cover entire walls with compact discs. Furthermore, the storage racks of the present invention may encourage artists to design the covers of the storage cases 35 as pieces of a larger picture such that when a number of the storage cases 35 are displayed in a rack of the present invention, a larger single image will be created. In this fashion, consumers will be more encouraged to purchase and entire series of compact discs from a recording artist in order to complete the overall image.

Figure 4:
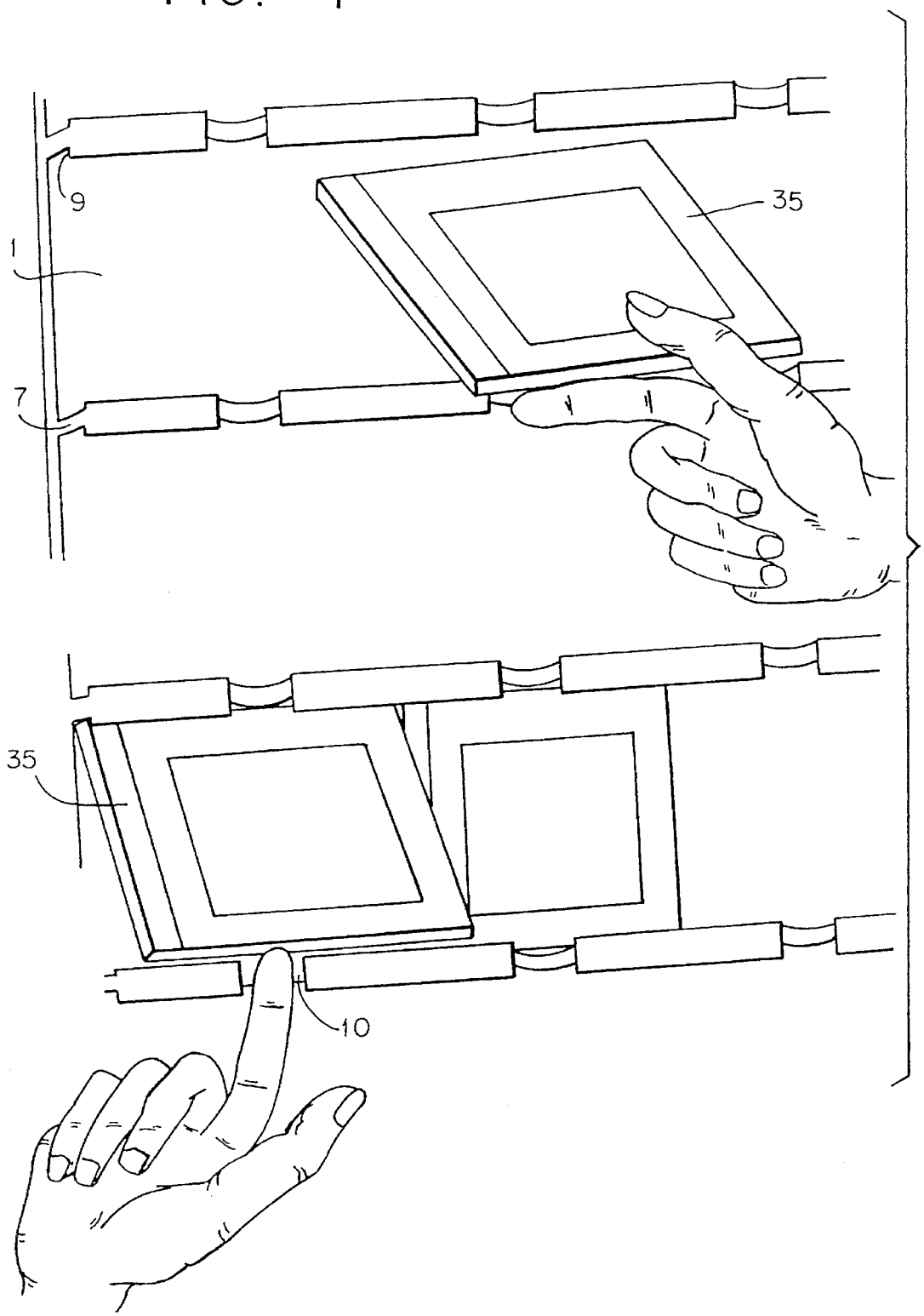
FIG. 4 illustrates the insertion and removal of a compact disc storage case from one embodiment of the instant invention.

Referring to FIG. 4, the insertion of a storage case 35 onto a shelf 7 of the rack of the instant invention by manual manipulation using an aperture 10 in flange 9 is depicted, as is the removal of the case 35 from a shelf 7 of the rack of the instant invention. A storage case 35 is first inserted upwardly behind the downwardly extending upper flange 9 in order to position the top of storage case behind that flange. With the top of the storage case 35 positioned against or very close to the underside of the shelf 7 above the shelf 7 upon which this storage case will rest, the lower end of the storage case 35 will then be rotated inwardly to a position substantially perpendicular to the back wall 1 of the rack and then the storage case 35 can be lowered such that the bottom of the storage case is maintained in position by the upwardly extending portion of flange 9 of the shelf 7 upon which the storage case 35 will rest. The distance between the bottom of downwardly extending upper flange 9 and the to of the corresponding upwardly extending flange 9 is less then the height of storage case 35 such that when the storage case 35 is in position and resting upon shelf 7, the storage case cannot fall upwardly Removal of the storage case 35 is simply accomplished in the reverse fashion wherein the storage case must first be raised so that the bottom of the storage case 35 clears the top of the upwardly extending, lowering flange 9 allowing the bottom of the storage case 35 to be drawn away from the rack and then then top of the storage case 35 is also drawn from beneath the upper, downwardly extending flange 9. Illustrated apertures 10 facilitate the raising of storage case 35 by allowing a person to simply insert one or more fingers below the storage case 35 to facilitate raising the storage case 35.

While the present invention has been described in relation to compact disc storage cases, it is within the scope of the present invention to provide a rack useful with also forms of jackets and storage cases for other recording media. For example, the storage rack of the present invention can also be used with video cassettes, audio cassettes, and other forms of the media which may become popular in the future.

The rack of the instant invention and its components can be made from numerous suitable materials including plastics, metals, or woods, and can vary in size to suit commercial or domestic needs. Other than the removable side walls, the remainder of the rack may be formed as a unitary structure, for example, by insert molding.

What is claimed is:

1. A compact disc storage case display rack comprising:

a back panel;

a plurality of shelves arranged substantially parallel to one another and attached to said back panel at spaced intervals, said shelves having a depth greater than the thickness of a compact disc storage case and having flanges extending slightly above and below said shelves, said flanges having a plurality of spaced apertures which facilitate removal of a compact disc storage case from said rack; and at least one selectively removable side wall attached to one of said back panel or at least one of said shelves.

2. A display rack according to claim 1 wherein said back panel is substantially rectangular in configuration and contains means for mounting the rack on a separate support structure.

3. A display rack according to claim 1 wherein said shelves are spaced from one another at a distance of between about 5" to 5½".

4. A display rack according to claim 1 wherein the portion of said flanges extending below said shelves is larger than the portion of said flanges extending above said shelves.

5. A display rack according to claim 1 wherein said back panel, side walls, and shelves comprise materials selected from the group consisting of wood, plastic, and metals.

6. A display rack according to claim 1 wherein said rack further comprises means for connecting said rack to another rack.

7. A display rack according to claim 1 wherein said flange apertures are spaced along a flange at intervals of approximately 5" and are arranged one on top of the other along axes parallel to said side walls and said shelves are spaced from one another at a distance of between about 5" to 5½" and have a depth of between ¼" to 1½".

8. A display rack according to claim 1 wherein said apertures extend entirely through said flanges of said shelves.

9. A display rack for storing recorded media storage case comprising:

a back panel;

a plurality of substantially horizontal shelves connected to said back panel;

at least one selectively removable side wall attached to one of said back panel or at least one of said shelves;

wherein a plurality of said shelves comprise an upwardly extending flange and a downwardly extending flange; and a plurality of spaced recess in said shelves adapted to receive a finger for removing a storage case from said rack.

10. A display rack for storing recorded media storage cases according to claim 9 wherein said upwardly extending flanges and said downwardly extending flanges are different sizes.

11. A display rack for storing recorded media storage cases according to claim 10 wherein said downwardly extending flanges are larger than said upwardly extending flanges.

12. A display rack for storing recorded media storage cases according to claim 10 wherein said recesses extend through said flanges and at least partially through said shelves.

* * * * *